(12) United States Patent
Guo (10) Patent No.: US 9,030,820 B2
(45) Date of Patent: May 12, 2015

(54) NOTEBOOK COMPUTER WITH TELESCOPIC MECHANISM FOR ADJUSTING INCLINATION

(71) Applicants: Fu Tai Hua Industry (Shenzhen) Co., Ltd., Shenzhen (CN); Hon Hai Precision Industry Co., Ltd., New Taipei (TW)

(72) Inventor: Ji-Bing Guo, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 184 days.

(21) Appl. No.: 13/753,317

(22) Filed: Jan. 29, 2013

(65) Prior Publication Data

US 2013/0229763 A1 Sep. 5, 2013

(30) Foreign Application Priority Data

Mar. 5, 2012 (CN) .......................... 2012 1 00054580

(51) Int. Cl.
*G06F 1/16* (2006.01)
*G06F 1/20* (2006.01)

(52) U.S. Cl.
CPC .............. *G06F 1/1637* (2013.01); *G06F 1/166* (2013.01); *G06F 1/1681* (2013.01); *G06F 1/203* (2013.01)

(58) Field of Classification Search
USPC ........................................ 361/679.27, 679.59
See application file for complete search history.

(56) References Cited

U.S. PATENT DOCUMENTS

| | | | | |
|---|---|---|---|---|
| 4,571,456 A * | 2/1986 | Paulsen et al. | ................. | 379/457 |
| 6,053,589 A * | 4/2000 | Lin | ................. | 312/271 |
| 7,679,905 B2 * | 3/2010 | Wu et al. | .................. | 361/679.59 |
| 7,784,752 B2 * | 8/2010 | Tang | .......................... | 248/188.8 |
| 7,898,802 B2 * | 3/2011 | Lian | ................. | 361/679.59 |
| 7,926,781 B2 * | 4/2011 | Wang | ........................... | 248/685 |
| 7,950,611 B2 * | 5/2011 | Tracy et al. | ................. | 248/176.3 |
| 7,986,525 B2 * | 7/2011 | Wang | ........................ | 361/679.59 |
| 8,050,031 B2 * | 11/2011 | Wang | ........................ | 361/679.59 |
| 8,050,032 B2 * | 11/2011 | Trang | ........................ | 361/679.59 |
| 8,139,357 B2 * | 3/2012 | Trang | ........................ | 361/679.59 |
| 8,213,177 B2 * | 7/2012 | Uttermann et al. | ...... | 361/679.59 |
| 8,220,771 B2 * | 7/2012 | Wang | ........................... | 248/685 |
| 8,264,839 B2 * | 9/2012 | Shen et al. | ................. | 361/679.59 |
| 8,792,237 B2 * | 7/2014 | Guo | .......................... | 361/679.59 |
| 2005/0057894 A1* | 3/2005 | Kim et al. | .................... | 361/683 |
| 2011/0222233 A1* | 9/2011 | Lu et al. | ................... | 361/679.21 |
| 2013/0250495 A1* | 9/2013 | Yu | ............................ | 361/679.01 |

* cited by examiner

*Primary Examiner* — Lisa Lea Edmonds
(74) *Attorney, Agent, or Firm* — Novak Druce Connolly Bove + Quigg LLP (57) ABSTRACT

A notebook computer includes a display connected to a base by a pivot. The base defines a receiving space by a cover and a housing. The notebook computer further includes a telescopic mechanism arranged near the pivot in the receiving space. The telescopic mechanism protrudes from the housing via a first through hole defined in a bottom of the housing to maintain the base at certain inclination on a supporting surface; the notebook computer is in a first working state. The notebook computer switches to a second working state from the first working state when the telescopic mechanism retracts into the housing.

19 Claims, 8 Drawing Sheets

NOTEBOOK COMPUTER WITH TELESCOPIC MECHANISM FOR ADJUSTING INCLINATION

BACKGROUND

1. Technical Field

The present disclosure relates to a notebook computer and in particular a notebook computer with a telescopic mechanism for adjusting inclination.

2. Description of Related Art

Generally, four pads are arranged in the bottom of the notebook computer for supporting the notebook computer on a supporting surface, such as a desk. However, due to the thickness of the pads, the bottom of the notebook computer is very close to the supporting surface, which is not ideal for heat dissipation.

Therefore, a notebook computer to overcome the above described shortcoming is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments in detail.

Figure 1:
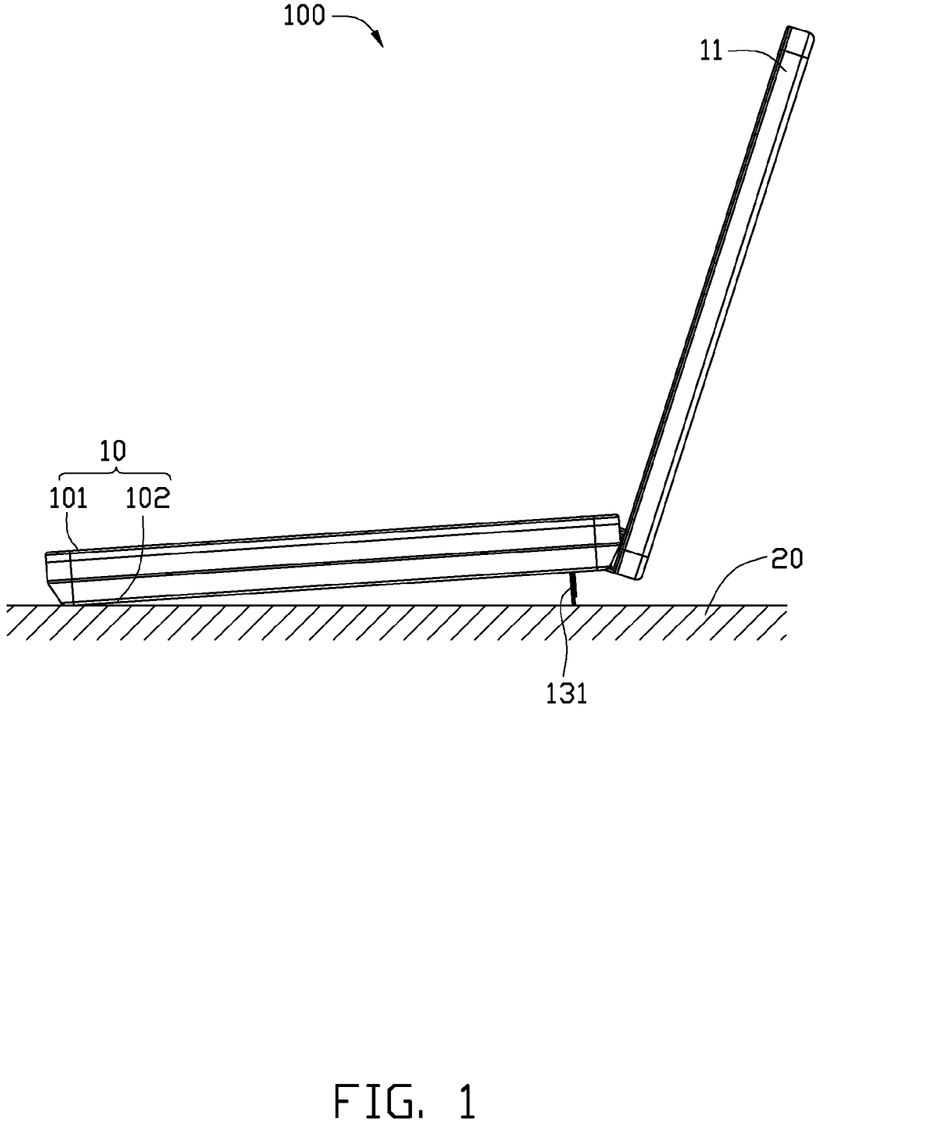
FIG. 1 is a side view of a notebook computer in a first working state according to one embodiment.
Figure 2:
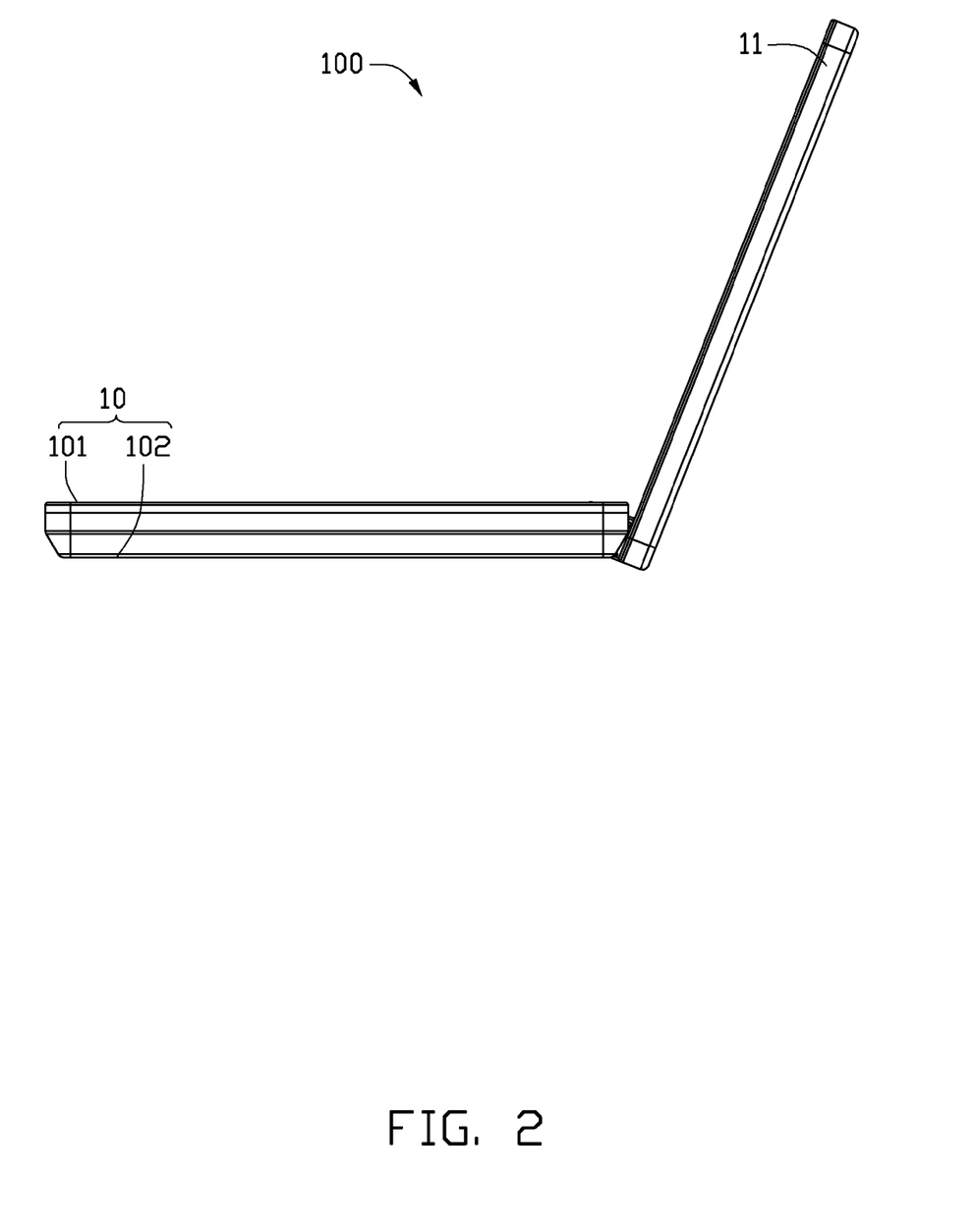
FIG. 2 is a side view of the notebook computer of FIG. 1 in a second working state.
Figure 3:
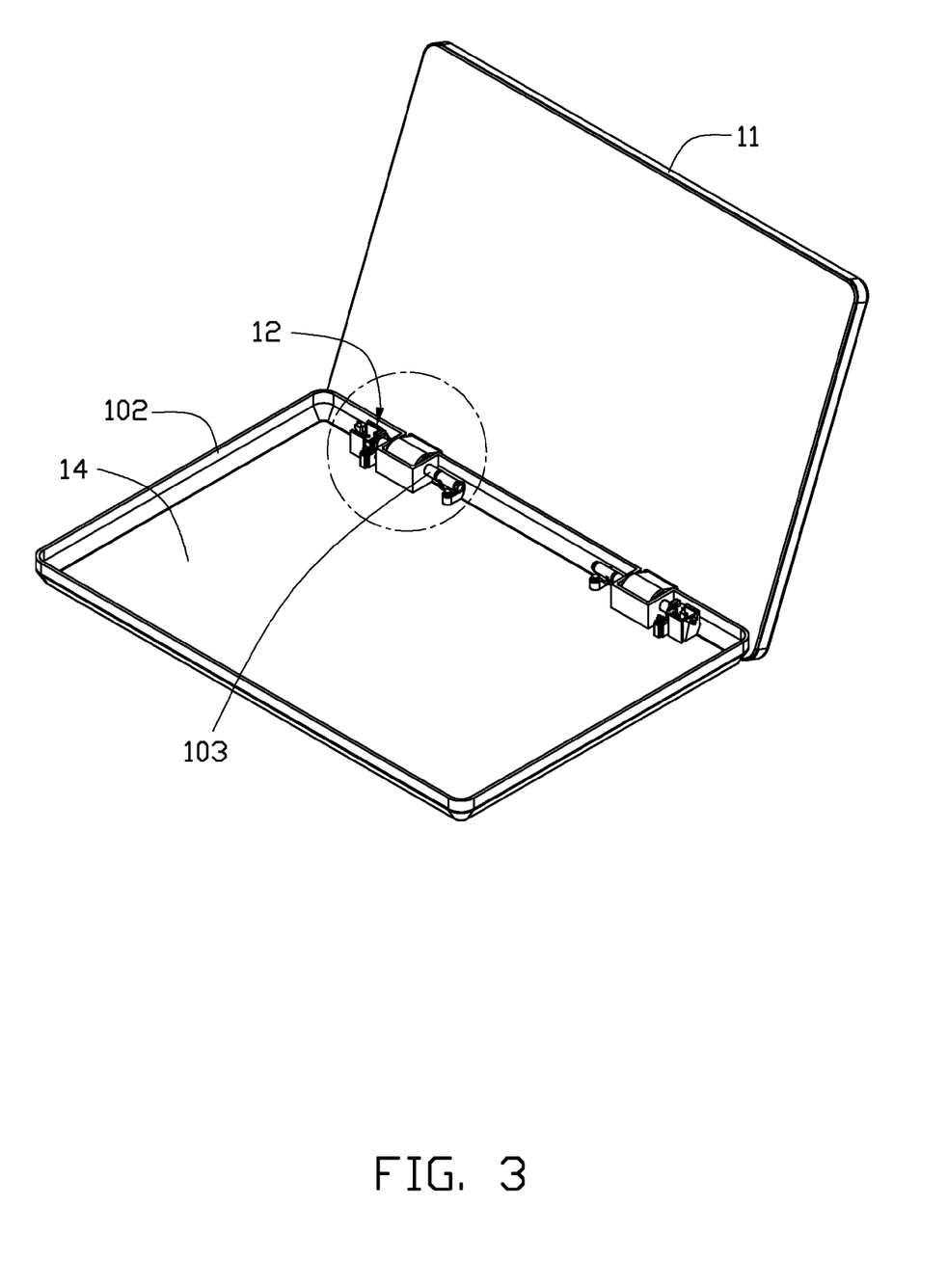
FIG. 3 is a schematic view of internal structure of the notebook computer of FIG. 1.
Figure 6:
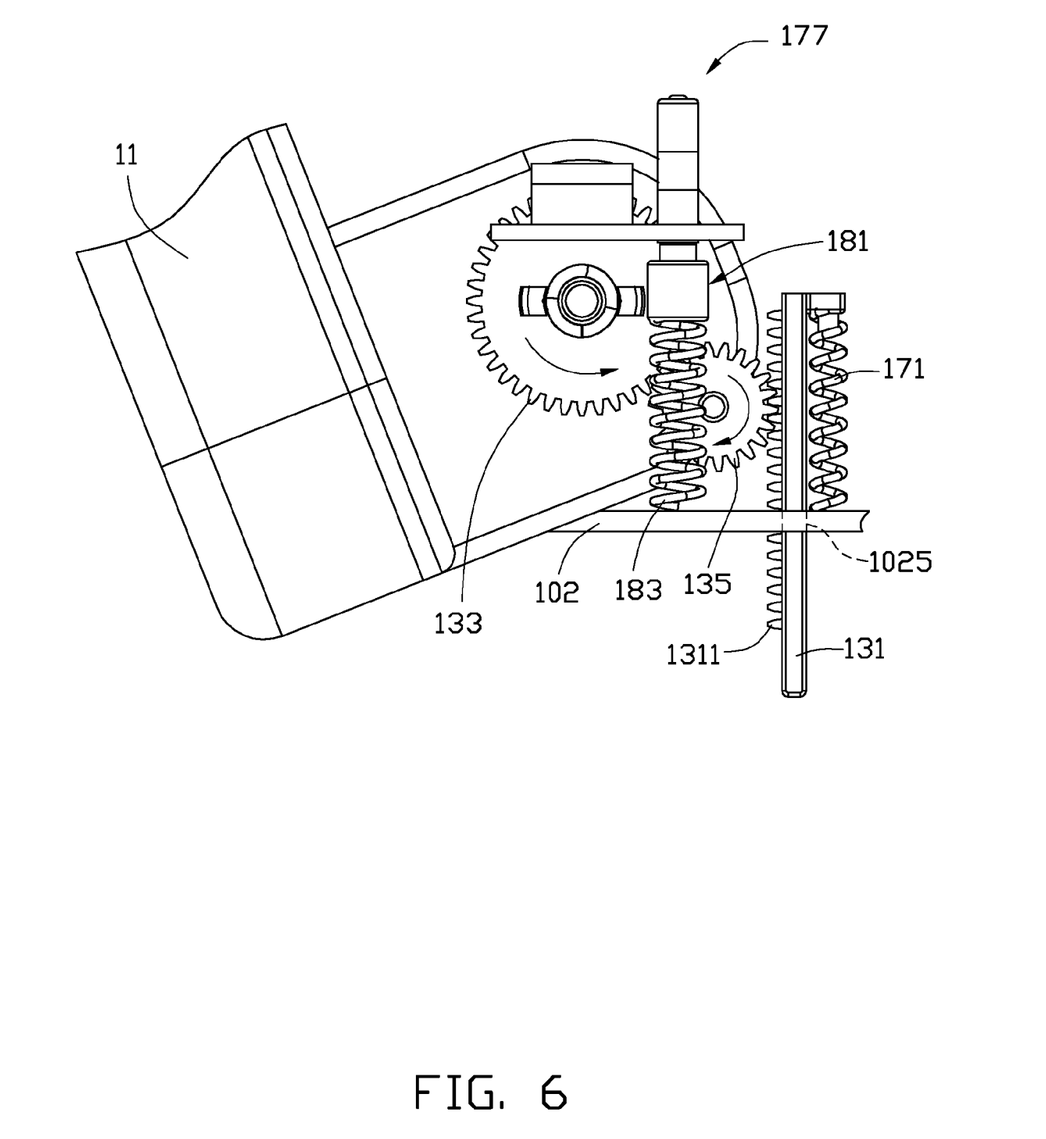
FIG. 6 is a schematic view of the telescopic mechanism of FIG. 4 when the notebook computer of FIG. 1 is opened.

FIGS. 1-3 show a notebook computer 100 of one embodiment. The notebook computer 100 includes a base 10, a pivot 103, and a display 11. One side of the base 10 pivotally connects to the display 11. The base 10 includes a cover 101 and a housing 102. The cover 101 and the housing 102 form a receiving space 14. The pivot 103 is fixed on the housing 102 in the receiving space 14. The display 11 is capable of rotating around the pivot 103. The notebook computer 100 further includes a telescopic mechanism 12 arranged near the pivot 103. In the embodiment, the notebook computer 100 includes two pivots 103 spaced from each other and arranged at one side of the housing 102. The notebook computer 100 includes two telescopic mechanisms 12. The housing 102 defines a first through hole 1025 as shown in FIG. 6 corresponds to each telescopic mechanism 12. When the telescopic mechanism 12 protrudes from the housing 102 via the first through hole 1025, the base 10 maintains a certain inclination on a supporting surface 20. Under this condition, the notebook computer 100 is in a first working state. When the telescopic mechanism 12 retracts into the housing 102 as shown in FIG. 2, the notebook computer 100 is in a second working state.

Figure 4:
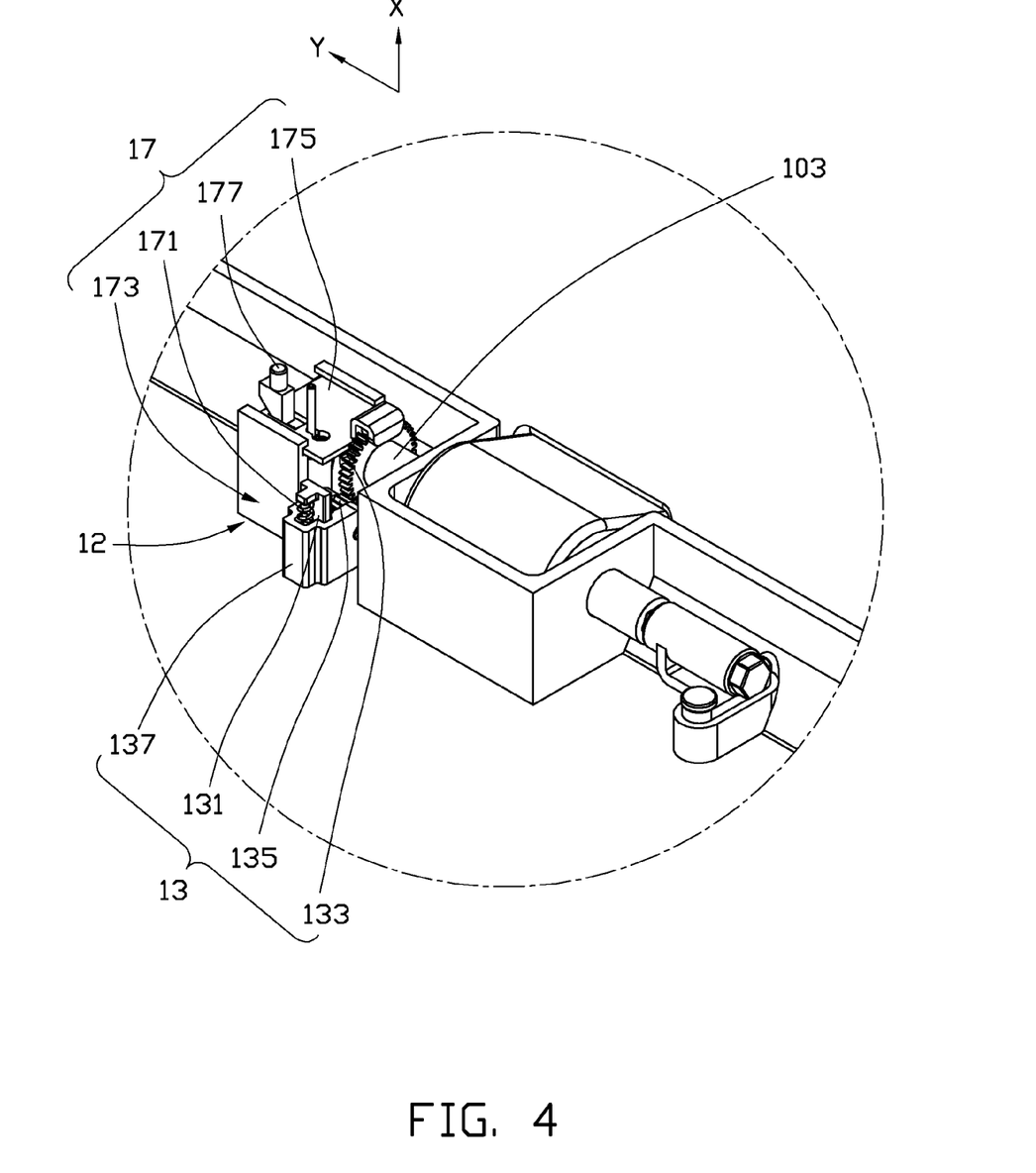
FIG. 4 is an enlarged view of a telescopic mechanism of the notebook computer of FIG. 3.
Figure 5:
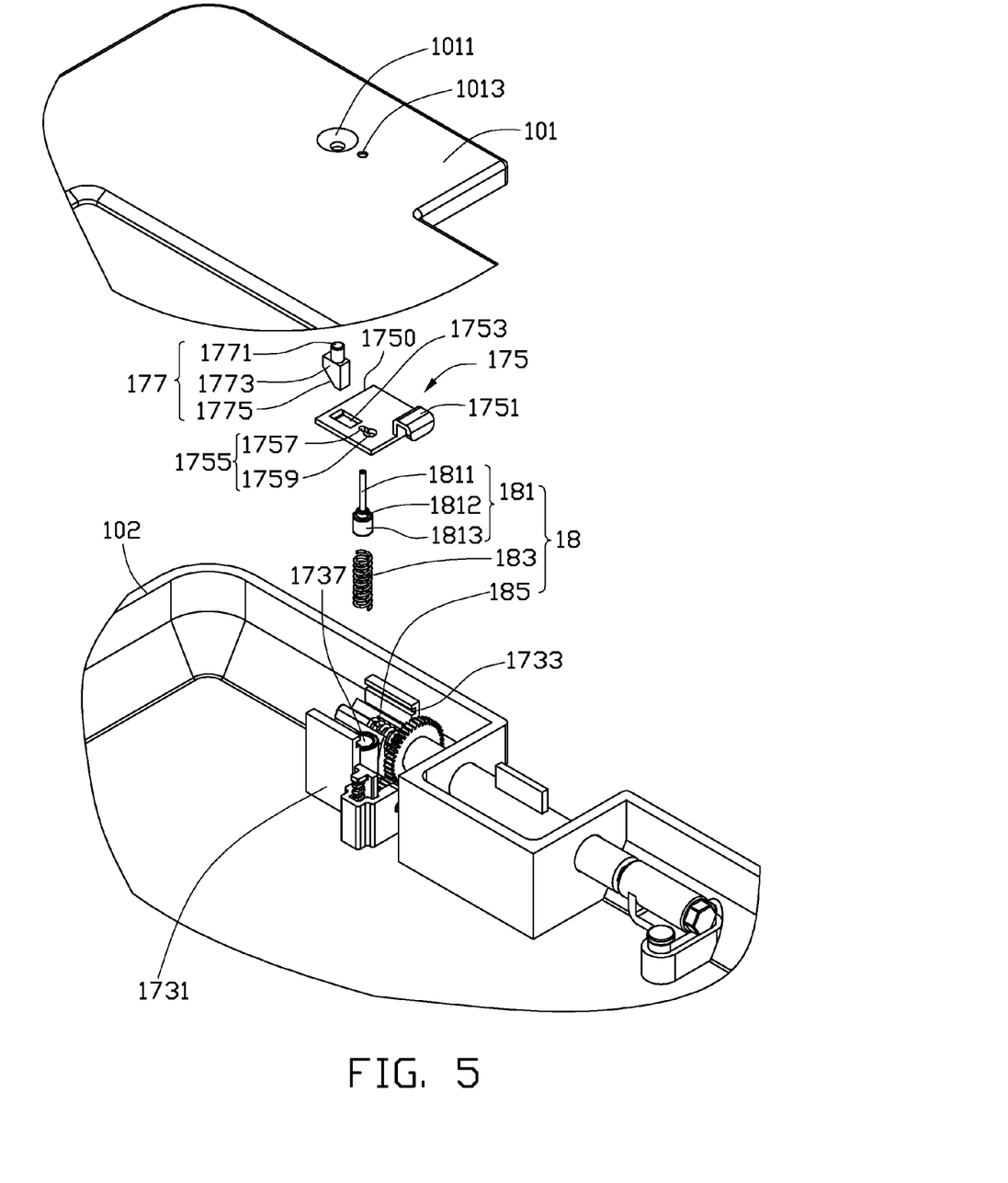
FIG. 5 is a partial exploded view of the telescopic mechanism of the FIG. 4.

Referring to FIGS. 4-6, the telescopic mechanism 12 includes an extending unit 13, a retracting unit 17, and a resetting unit 18. When the notebook computer 100 is closed, the telescopic mechanism 12 is defined as in an initial state, which is received in the receiving space 14. When the display 11 rotates away from the base 10, the extending unit 13 automatically protrudes from the housing 102 via the first through hole 1025 to maintain the base 10 at a certain inclination on the supporting surface 20. The retracting unit 17 is configured to control the notebook computer 100 to switch to the second working state from the first working state. The resetting unit 18 is configured to reset the telescopic mechanism 12 to the initial state when the notebook computer 100 is closed.

The extending unit 13 includes a leg 131, a first gear 133, a second gear 135, and a position limiter 137. The first gear 133 encircles the pivot 103. The position limiter 137 is arranged on the housing 102 and defines a space configured to receive and fix the leg 131 and the second gear 135. The leg 131 is capable of sliding in the position limiter 137 along a first direction X perpendicular to the housing 102. The first gear 133 is capable of mating with the second gear 135. The leg 131 includes a rack 1311 formed on a surface adjacent to the second gear 135. The second gear 135 mates with the rack 1311. When the display 11 rotates away from the base 10, the first gear 133 drives the leg 131 to protrude from the base 10 via the first through hole 1025.

Figure 8:
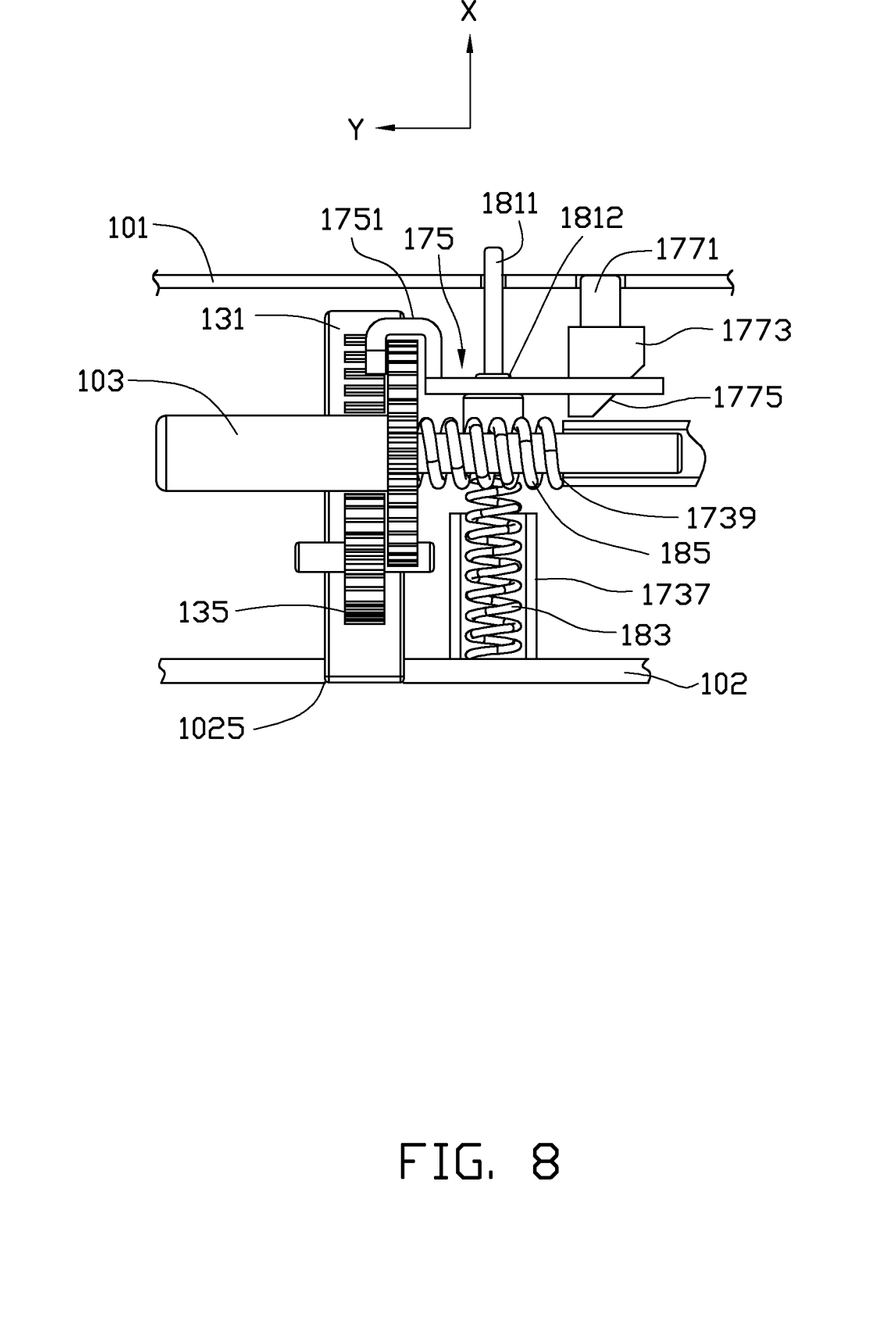
FIG. 8 is similar to a view of the telescopic mechanism of FIG. 7, but showing the notebook computer is in a second working state.

The retracting unit 17 includes a fixing portion 173, a connector 175, a first elastic member 171, and an operation portion 177. The fixing portion 173 is arranged on the housing 102. The fixing portion 173 includes two sidewalls 1731 extending perpendicularly from a bottom of the housing 102. The fixing portion 173 further includes a bushing 1737 and a resisting portion 1739 arranged between the two sidewalls 1731 as shown in FIG. 8. The bushing 1737 extends from the bottom of the housing 102. One end of the pivot 103 is received in a space defined by the resisting portion 1739 and resists the resisting portion 1739. Each sidewall 1731 defines a sliding groove 1733 parallel to the bottom of the housing 102.

The connector 175 includes a lid 1750 and a hook 1751 arranged at one side of the lid 1750. Two opposite sides of the lid 1750 are received in the two sliding grooves 1733, such that the lid 1750 is capable of sliding along the two sliding grooves 1733 in a second direction Y perpendicular to the first direction X. The hook 1751 latches with the first gear 133. The lid 1750 defines a second through hole 1753 away from the hook 1751. In the embodiment, the second through hole 1753 is rectangular. The lid 1750 further defines a calabash-shaped hole 1755 between the second through hole 1753 and the hook 1751. The calabash-shaped hole 1755 includes a position hole 1757 and a fixing hole 1759 communicating with the position hole 1757, and a diameter of the position hole 1757 is smaller than a diameter of the fixing hole 1759. The first elastic member 171 is sandwiched between one end of the leg 131 and the bottom of the housing 102. The first elastic member 171 and the leg 131 are both received in the position limiter 137. In the embodiment, the first elastic member 171 is a spring.

The operating portion 177 includes a button 1771 and a wedge 1773. The button 1771 protrudes out of the cover 101 via a third through hole 1011 defined in the cover 101. The wedge 1773 defines an inclined surface 1775, which resists one side of the second through hole 1753.

The resetting unit 18 includes a latching portion 181, a second elastic member 183, and a third elastic member 185. The latching portion 181 is a column. The latching portion 181 includes a position bar 1811, a fixing member 1812, and a sleeve 1813. The diameter of the position bar 1811 is smaller than that of the fixing member 1812. The position bar 1811 is capable of protruding out of the cover 101 via a fourth through hole 1013 defined in the cover 101. The position bar 1811 can be received in the position hole 1757. The fixing member 1812 can be fixed in the fixing hole 1759. The second elastic member 183 is fixed between the bushing 1737 and the sleeve 1813. The third elastic member 185 encircles the pivot 103 and is sandwiched between the resisting portion 1737 and the first gear 133. In the embodiment, the second elastic member 183 and the third elastic member 185 are both springs.

When the notebook computer 100 is closed, the telescopic mechanism 12 is in the initial state. The leg 131 is received in the base 10, the first gear 133 mates with the second gear 135, the first elastic member 171 is in its natural state. When the notebook computer 100 is opened as partly shown in FIG. 6, the display 11 rotates away from the base 10 around the pivot 103. The pivot 103 drives the first gear 133 to rotate counterclockwise and the second gear 135 rotates clockwise as shown in FIG. 6. The second gear 135 drives the leg 131 to protrude out of the housing 102 via the first through hole 1025. Thus, the notebook computer 100 is in the first working state. When the notebook computer 100 is closed, the display 11 rotates towards the base 10 around the pivot 103. The pivot 103 drives the first gear 133 to rotate clockwise and the second pivot 103 rotates counterclockwise. Thus, the second gear 135 drives the leg 131 to retract into the housing 102 via the first through hole 1025.

Figure 7:
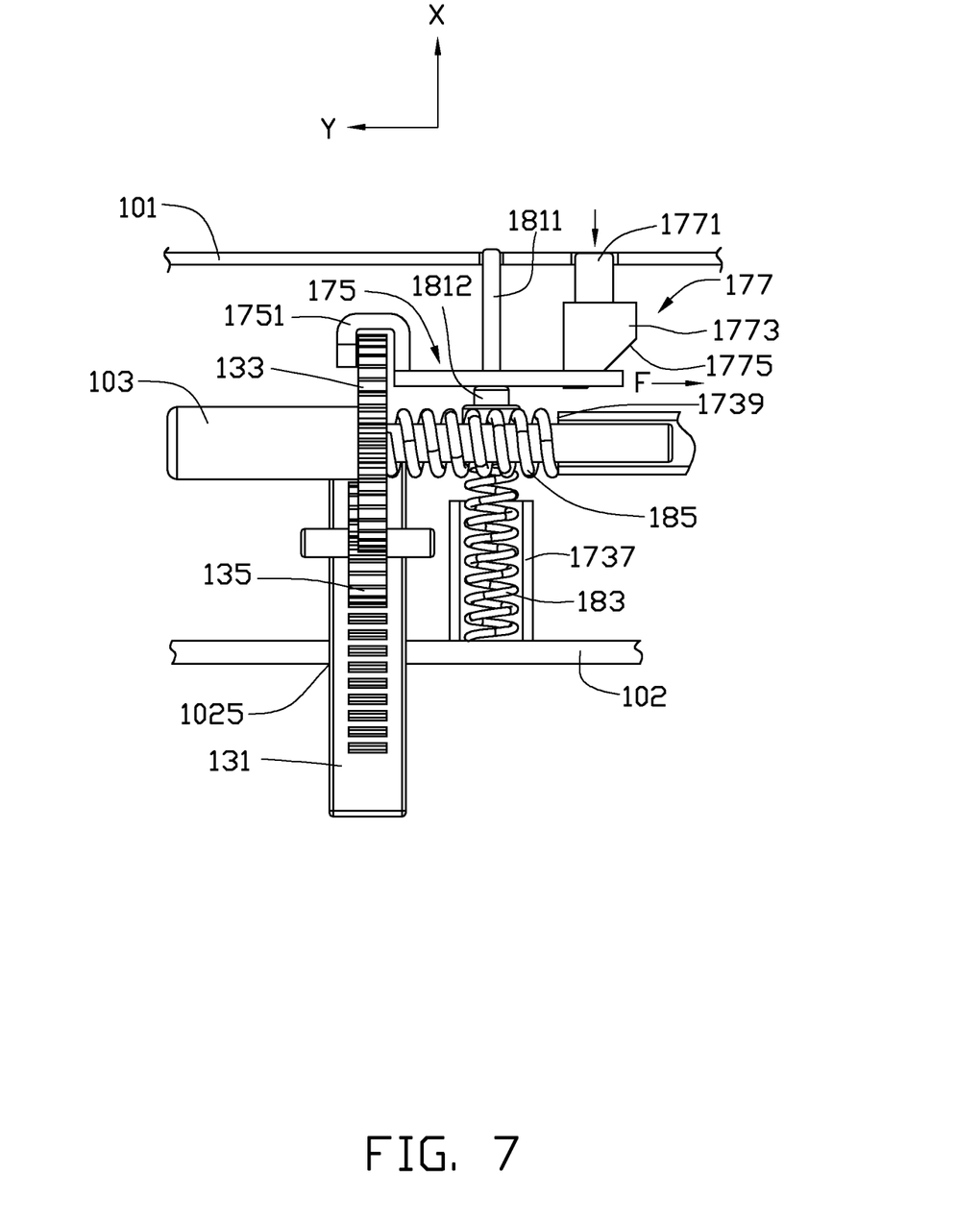
FIG. 7 is a schematic view of the telescopic mechanism of FIG. 4 when the notebook computer is in a first working state.

FIG. 7 shows the notebook computer 100 in the first working state. The first gear 133 mates with the second gear 135, the first elastic member 171 and the second elastic member 183 are both compressed. The third elastic member 185 is in its natural state. The position bar 1811 is latched in the position hole 1757. When the button 1771 is pressed, the inclined surface 1775 applies a force to the lid 1750, the lid 1750 slides along the two sliding grooves 1733 in the second direction Y. The hook 1751 pulls the first gear 133 to separate from the second gear 135, thus the first elastic member 171 drives the leg 131 to retract into the base 10. At the same time, the fixing hole 1759 is moved with the lid 1750 to align with latching portion 181. Under this condition, the second elastic member 183 drives the position bar 1811 of the latching portion 181 to move in the fixing hole 1759 along the first direction X until the fixing member 1812 is latched to the fixing hole 1759. Thus, the notebook computer 100 switches to the second working state as shown in FIG. 2.

FIG. 8 shows the telescopic mechanism 12, when the notebook computer 100 is in the second working state. The position bar 1811 protrudes out of the cover 101 via the fourth through hole 1013, and the third elastic member 185 is compressed. When the notebook computer 100 is closed, the display 11 presses the position bar 1811 along with the first direction X to make the fixing member 1812 be released from the fixing hole 1759. Under this condition, the third elastic member 185 drives the first gear 133 to move along the second direction Y to make the first gear 133 mate with the second gear 135 again. That is, the telescopic mechanism 12 returns to the initial state.

In summary, the notebook computer 100 includes the telescopic mechanism 12 to keep the base 10 at certain inclination on the supporting surface 20 when the notebook computer 100 is opened, thus the notebook computer 100 dissipates heat better than being supported by four conventional pads.

It is to be understood that even though numerous characteristics and advantages of the present embodiments have been set forth in the foregoing description, together with details of the structures and functions of the embodiments, the disclosure is illustrative only; and changes may be in detail, especially in the matters of shape, size and arrangement of parts within the principles of the embodiments to the full extent indicated by the broad general meaning of the terms in which the appended claims are expressed.

What is claimed is:

1. A notebook computer, comprising:
 a display connected to a base by a pivot;
 the base comprising a cover and a housing defining a receiving space; and
 a telescopic mechanism corresponded to the pivot in the receiving space, wherein the telescopic mechanism protrudes from the housing via a first through hole defined in a bottom of the housing, the telescopic mechanism being perpendicular to the bottom of the housing to support the base at a certain inclination angle relative to a supporting surface when the notebook computer is in a first working state; the telescopic mechanism retracts into the housing when the notebook computer switches to a second working state from the first working state.

2. The notebook computer of claim 1, wherein the telescopic mechanism comprises an extending unit, when the notebook computer is closed, the extending unit is received in the receiving space; when the display rotates away from the base, the extending unit protrudes out of the housing via the first through hole; when the notebook computer is switched to the second working state, the extending unit retracts into the receiving space.

3. The notebook computer of claim 2, wherein the extending unit comprises a leg, a first gear, a second gear, and a position limiter, the first gear encircles the pivot and mates with the second gear; the position limiter is arranged on the housing and defines a space to receive and fix the leg and the second gear; the leg is capable of sliding in the position limiter along a first direction perpendicular to the housing.

4. The notebook computer of claim 3, wherein the leg comprises a rack formed on a surface adjacent to the second gear, the second gear mates with the rack; when the notebook computer is opened, the second gear drives the leg to protrude from the base via the first through hole.

5. The notebook computer of claim 4, wherein the telescopic mechanism further comprises a retracting unit to control the notebook computer to switch to the second working state from the first working state.

6. The notebook computer of claim 5, wherein the retracting unit comprises a fixing portion, a connector, a first elastic member, and an operation portion; the fixing portion is arranged on the housing and comprises two sidewalls extending perpendicularly from a bottom of the housing; each sidewall defines a sliding groove parallel to the bottom of the housing; the connector is latched in the two sliding grooves, the connector is capable of sliding along the two sliding grooves in a second direction perpendicular to the first direction.

7. The notebook computer of claim 6, wherein when the operating portion is operated, the operating portion drives the connector to move along the second direction to pull the first gear to separate from the second gear, and the first elastic member drives the leg to retract into the receiving space.

8. The notebook computer of claim 6, wherein the connector comprises a lid connected to a hook, the lid is latched between the two sliding grooves, the hook latches the first gear; the lid defines a second through hole away from the hook.

9. The notebook computer of claim 8, wherein the operating portion comprises a button connected to a wedge, the button protrudes out of the cover via a third through hole defined in the cover, the wedge defines an inclined surface resisting one side of the second through hole; when the button is pressed, the inclined surface applies a force to the lid, the lid slides along the two sliding grooves.

10. The notebook computer of claim 9, wherein the telescopic mechanism comprises a resetting unit to reset the first gear mate with the second gear when the notebook computer is closed from the second working state.

11. The notebook computer of claim 10, wherein the resetting unit comprises a latching portion, a second elastic member, and a third elastic member; the latching portion latches the lid, the second elastic member drives the latching portion to move along the first direction, the third elastic member drives the first gear to mate with the second gear.

12. The notebook computer of claim 11, wherein the lid further defines a calabash-shaped hole between the second through hole and the hook to receive the latching portion; the calabash-shaped hole comprises a position hole and a fixing hole, and a diameter of the position hole is smaller than a diameter of the fixing hole.

13. The notebook computer of claim 12, wherein the latching portion comprises a position bar, a fixing member, and a sleeve, the position bar and the fixing member are received in the position hole and the fixing hole respectively, and a diameter of the position bar is smaller than a diameter of the fixing member correspondingly.

14. The notebook computer of claim 13, wherein when the notebook computer is in the first working state the position bar is latched in the position hole; when the notebook computer is in the second working state, the fixing member is latched in the fixing hole.

15. The notebook computer of claim 14, wherein when the notebook computer switches to the second working state from the first working state, the second elastic member drives the latching portion to move along the first direction, thus the fixing member is latched in the fixing hole.

16. The notebook computer of claim 14, wherein the notebook computer is in the second working state, the position bar protrudes out of the cover via a fourth through hole, and the third elastic member is compressed.

17. The notebook computer of claim 15, wherein when the notebook computer is closed, the display presses the position bar to move along the first direction, the third elastic member drives the first gear to mate with the second gear.

18. A notebook computer, comprising:
a display pivotally connected to a base by a pivot;
the base having a cover and a housing cooperatively defining a receiving space; and
a telescopic mechanism corresponding to the pivot in the receiving space, wherein the telescopic mechanism protrudes out the housing from a first through hole defined in a bottom of the housing, the telescopic mechanism being perpendicular to the bottom of the housing to support the base at a certain inclination angle relative to a supporting surface when the notebook computer is opened on the supporting surface.

19. A notebook computer, comprising:
a display connected to a base by a pivot;
the base comprising a cover and a housing defining a receiving space; and
a telescopic mechanism corresponding to the pivot in the receiving space, wherein the telescopic mechanism protrudes from the housing via a first through hole defined in a bottom of the housing to support the base at a certain inclination angle on a supporting surface when the notebook computer is in a first working state; the telescopic mechanism retracts into the housing when the notebook computer switches to a second working state from the first working state; and
wherein the telescopic mechanism comprises an extending unit, the extending unit comprises a leg, a first gear, a second gear, and a position limiter, the first gear encircles the pivot and mates with the second gear; the position limiter is arranged on the housing and defines a space to receive and fix the leg and the second gear; and the leg is capable of sliding in the position limiter along a first direction perpendicular to the housing.

* * * * *